United States Patent [19]

Meade et al.

[11] Patent Number: 5,318,405
[45] Date of Patent: Jun. 7, 1994

[54] TURBINE DISK INTERSTAGE SEAL ANTI-ROTATION KEY THROUGH DISK DOVETAIL SLOT

[75] Inventors: Robert J. Meade, West Chester; Richard W. Albrecht, Fairfield, both of Ohio

[73] Assignee: General Electric Company, Cincinnati, Ohio

[21] Appl. No.: 32,087

[22] Filed: Mar. 17, 1993

[51] Int. Cl.⁵ .................................................. F01D 5/32
[52] U.S. Cl. ................................. 416/220 R; 416/95
[58] Field of Search ........................... 415/115, 116; 416/219 R, 220 R, 204 R, 204 A, 95

[56] References Cited

U.S. PATENT DOCUMENTS

| | | | |
|---|---|---|---|
| 2,985,426 | 5/1961 | Hunter et al. | 416/219 R |
| 2,988,325 | 6/1961 | Dawson | 416/95 |
| 3,245,657 | 4/1966 | Cooper, Jr. et al. | |
| 3,266,770 | 8/1966 | Harlow | |
| 3,356,340 | 12/1966 | Bobo | |
| 3,936,234 | 2/1976 | Tucker et al. | 416/220 R |
| 4,470,756 | 9/1984 | Rigo et al. | 416/219 R |
| 4,474,535 | 10/1984 | Dhuic | 416/220 R |
| 4,527,952 | 7/1985 | Forestier et al. | |
| 4,604,033 | 8/1986 | Surdi | |
| 4,659,285 | 4/1987 | Kalogeros et al. | 416/220 R |
| 4,668,167 | 5/1987 | Le Maout et al. | |
| 4,846,628 | 7/1989 | Antonellis | 416/220 R |
| 4,854,821 | 8/1989 | Kernon et al. | 416/95 |
| 5,151,013 | 9/1992 | Moore | 416/220 R |
| 5,169,289 | 12/1992 | Lalanne | 416/219 R |
| 5,232,335 | 8/1993 | Narayana et al. | 415/115 |

FOREIGN PATENT DOCUMENTS

| | | | |
|---|---|---|---|
| 670665 | 4/1952 | United Kingdom | 416/220 R |
| 1491480 | 11/1977 | United Kingdom | 416/220 R |

*Primary Examiner*—John T. Kwon
*Attorney, Agent, or Firm*—Jerome C. Squillaro; Nathan D. Herkamp

[57] ABSTRACT

An anti-rotation system for an interstage seal located in a gas turbine engine of a type having a turbine section including a first stage disk and a second stage disk, each having a plurality of dovetail slots. The interstage seal is located between the disks and includes a web portion having a forward arm and an aft arm, the aft arm having a bayonet connection for preventing relative axial movement between the second stage disk and the seal The interstage seal anti-rotation system includes a key positioned in at least one dovetail slot and having a tab for interconnecting with a slot formed in the aft arm bayonet connection. The key prevents relative circumferential movement between the interstage seal and the second stage disk An aft seal plate is provided for retaining the key in the interconnected position between the seal and the second stage disk. The key is contoured to coincide with the dovetail slot for maximizes the translation of tangential load from the interstage seal to the second stage disk, and includes a slot formed along its length for allowing blade cooling air to flow radially outward to the turbine blades.

11 Claims, 3 Drawing Sheets

TURBINE DISK INTERSTAGE SEAL ANTI-ROTATION KEY THROUGH DISK DOVETAIL SLOT

BACKGROUND OF THE INVENTION

The present invention relates to gas turbine engines and, more particularly, to aircraft type high bypass ratio turbine engines having multi-stage compressor and turbine sections.

A typical modern gas turbine aircraft engine, particularly of the high bypass ratio type, includes multi-stage high pressure compressor and turbine sections interconnected by a central compression shaft or, in some models, a forward shaft. In the latter instance, the forward shaft extends between the webs of the last stage high pressure compressor disk and the first stage high pressure turbine disk webs. The high pressure turbine section typically includes first and second stage disks in which the second stage disk is attached to the first stage disk by a bolted connection. The interstage volume between the first and second stage disks is enclosed by a seal extending between the outer peripheries of the turbine disks. The seal is generally cylindrical in shape and its wall is outwardly convex in shape.

The first and second stage disks are isolated by a forward face plate, attached to the forward face of the first stage disk, and an aft seal attached to the rearward face of the second stage disk web. Typically, cooling air ducted externally from the compressor section is circulated within the volumes defined by the face plate and aft seal, as well as the interstage volume, in order to cool the disks and blades they support. The cooling air is conveyed radially outwardly from the turbine section through channels formed in the turbine blades.

In such engines, virtually all of the connections between components are accomplished through bolting. That is, the forward face plate is connected to the stage one disk by a circular pattern of bolts, extending about the face plate and disk. The inner periphery of the face plate is bolted to a disk positioned forwardly of the first stage disk. Similarly, the interstage thermal seal is connected to the turbine disks through bolts in a circular pattern, typically clamping angular blade retaining rims to the opposite faces of the turbine disks as well. In addition, the second stage disk includes a rearwardly-extending cone which is bolted to the aft seal.

A disadvantage of such bolted connections is that they require holes to be formed in the disks which create stress concentrations and limit the useful lives of the seals and disks. Furthermore, additional disk weight is required to sustain the stresses imposed by the bolt and bolt hole engagements. Accordingly, recent turbine engines have been designed incorporating bayonet connections between the forward face plate, interstage seal, aft seal and the first and second stage disks.

A disadvantage with such bayonet connections is that alignment of the first and second stage disks and seals is difficult to maintain during operation, which may result in excessive vibrations during operation.

Attempts have been made to prevent rotation of the interstage seal with respect to the turbine disks by inserting an anti-rotation pin between the bore of the interstate seal and the first stage disk aft shaft. Disadvantages with this design is that the anti-rotation pin requires additional hardware such as a ring or wire for axial retention, and the anti-rotation torque carrying capability is reduced due to the pin being located at the bore.

Accordingly, there is a need for a device which minimizes alignment problems between the first and second stage disks and the interstage seal and specifically, there is a need for a design which eliminates rotation of the interstage seal in connection with the second stage disk that has increased torque carrying capability and does not require separate hardware for retention.

SUMMARY OF THE INVENTION

The present invention is an aircraft-type gas turbine engine in which the interstage seal, in the turbine section are connected to the first stage disk and the second stage disk by boltless connections, thereby eliminating the time-consuming task of properly torquing the bolts and eliminating the stress concentration problems associated with bolted connections. Further, the present invention prevents rotation of the interstage seal with respect to the second stage disk by providing an anti-rotation key which is positioned in one or more dovetail slots in the second stage disk The interstage seal is attached to the stage one disk by a bayonet connection which prevents relative axial movement between these components and includes a peripheral rabbet which engages the stage one disk to prevent relative forward axial and outward radial movement of the seal. Relative rotational movement of the interstate seal is prevented by the anti-rotation key. Outward radial movement of the anti-rotation key is prevented by the bottom surface of the turbine blades. Forward axial movement of the anti-rotation key is prevented by the interstage seal while aft axial movement is restricted by an aft blade retainer.

The anti-rotation key prevents rotation of the interstage seal in relation to the second stage disk. In the event that the interstage seal would begin to rotate relative to the disk due to seal tooth rub or vibration, for instance, the key will begin to receive tangential load from the interstage seal and transfer the load to the disk along the length of the dovetail post. The key thus prevents relative tangential motion between the seal and the disk.

Accordingly, it is an object of the present invention to provide in an aircraft-type gas turbine engine, an anti-rotation key to prevent relative rotation between the interstage seal and the second stage disk; an anti-rotation key which maximizes the torque carrying capability of the key; and an anti-rotation key which eliminates the need for fasteners for retention of the key.

Other objects and advantages of the present invention will be apparent from the following description, the accompanying drawing and the appended claims.

DETAILED DESCRIPTION

Figure 1:
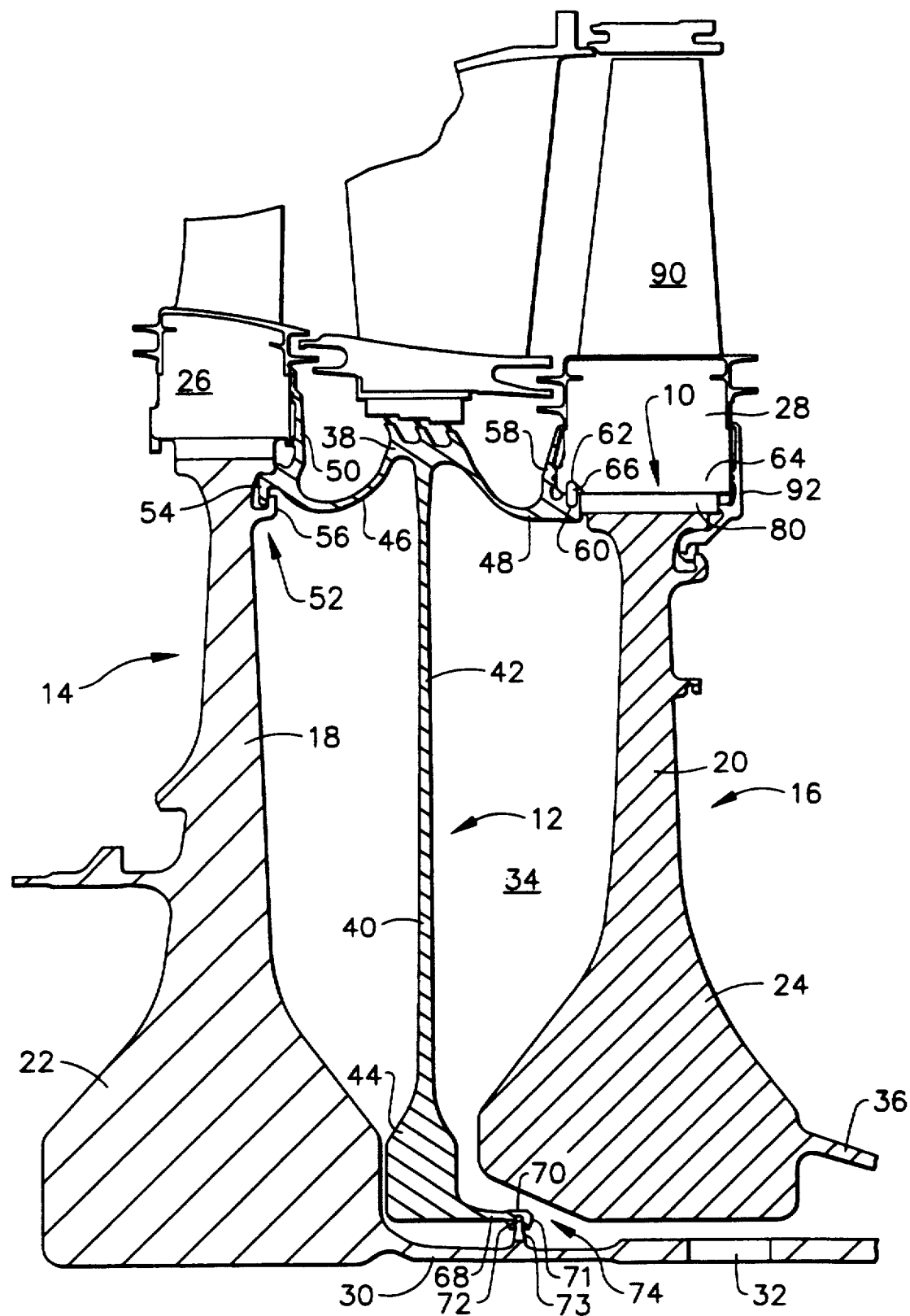
FIG. 1 is a partial side elevation in section of the turbine interstage seal of a gas turbine engine embodying the present invention.

As shown in FIG. 1, the present invention relates to an anti-rotation system, generally designated 10, for an interstage seal 12 located in the turbine section of an aircraft-type high bypass ratio gas turbine engine. The turbine section includes first and second stage disks 14, 16, each having a web 18, 20 extending radially outward from a bore 22, 24, respectively. The webs 18, 20 each terminate in an outer periphery consisting of a plurality of blade dovetail slots 26, 28, respectively.

Bore 22 of first stage disk 14 includes a rearwardly extending aft shaft 30 which includes a plurality of openings 32 which allow cooling air to enter the interstage volume 34. The second stage disk 16 includes a conical rear arm 36 which ultimately engages the aft shaft 30 at a splined connection.

The interstage seal 12 includes an outer shell 38 and a central disk 40 having a web 42 and a bore 44. The structure and bayonet connections of the interstage seal 12 are disclosed in more detail in commonly-owned U.S. Patent application Ser. No. 07/785,404 filed Oct. 30, 1991, which is incorporated herein by reference. Shell 38 includes a forward arm 46 and an aft arm 48, connected to first and second stage disks, 14, 16 respectively. The shell 38 is generally cylindrical in shape, and the forward and aft arms 46, 48 each have an inwardly convex shape. More specifically, the forward and aft arms 46, 48 each have a catenary curve, which extends from the shell, to the respective disks 14, 16.

The forward arm 46 includes radially extending blade-retaining rim 50 and forms a bayonet connection 52 with disk 18. Bayonet connection 52 includes a plurality of radially inward-extending tabs 54 extending from forward arm 46 which mesh with radially outwardly-extending tabs 56 formed on web 18 of disk 14.

Figure 2:
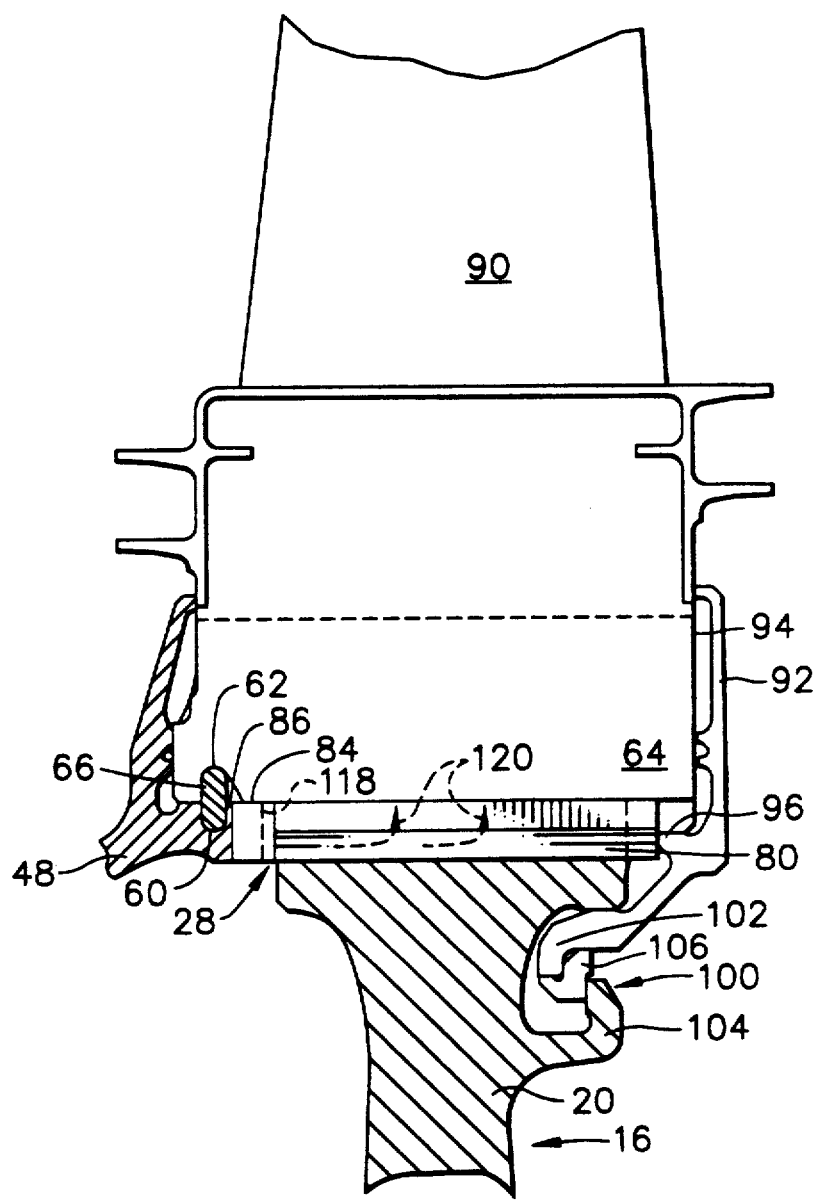
FIG. 2 is a detail of the seal of FIG. 1 showing the anti-rotation key as positioned in a dovetail slot.

Aft arm 48 includes an annular, peripheral rim 58 which engages blade dovetail slots 28 and acts as a blade retainer A seal is affected between the rim 58 and the dovetail slots. As also shown in FIG. 2, aft arm 48 includes a peripheral groove 60 which is aligned with a corresponding slot 62 formed in the disk post 64. A split ring 66 is positioned in the passageway formed by groove 60 and slot 62 and thereby prevents relative axial movement between aft arm 48 and disk 16.

Disk 40 includes a bore 44 having a conical, rearwardly extending arm 68 terminating in an enlarged tail portion 70. Tail portion 70 includes spaced bayonet tabs 71, each having a circumferentially-extending slot 72 extending radially outwardly from the lower surface of the tail portion to receive correspondingly-spaced tabs 73, formed on the aft shaft 30, in a bayonet connection 74. Tabs 71 are separated by arcuate notches formed in the tail portion 70 shaped to allow the tabs 73 to enter the slot 72 of the tail portion 70. Tabs 73 are separated by scallops which are deep enough to form openings to allow cooling air to flow between aft shaft 30 and conical arm 68. Bayonet connection 74 prevents the relative axial movement between bore 44 and aft shaft 30.

Figure 3:
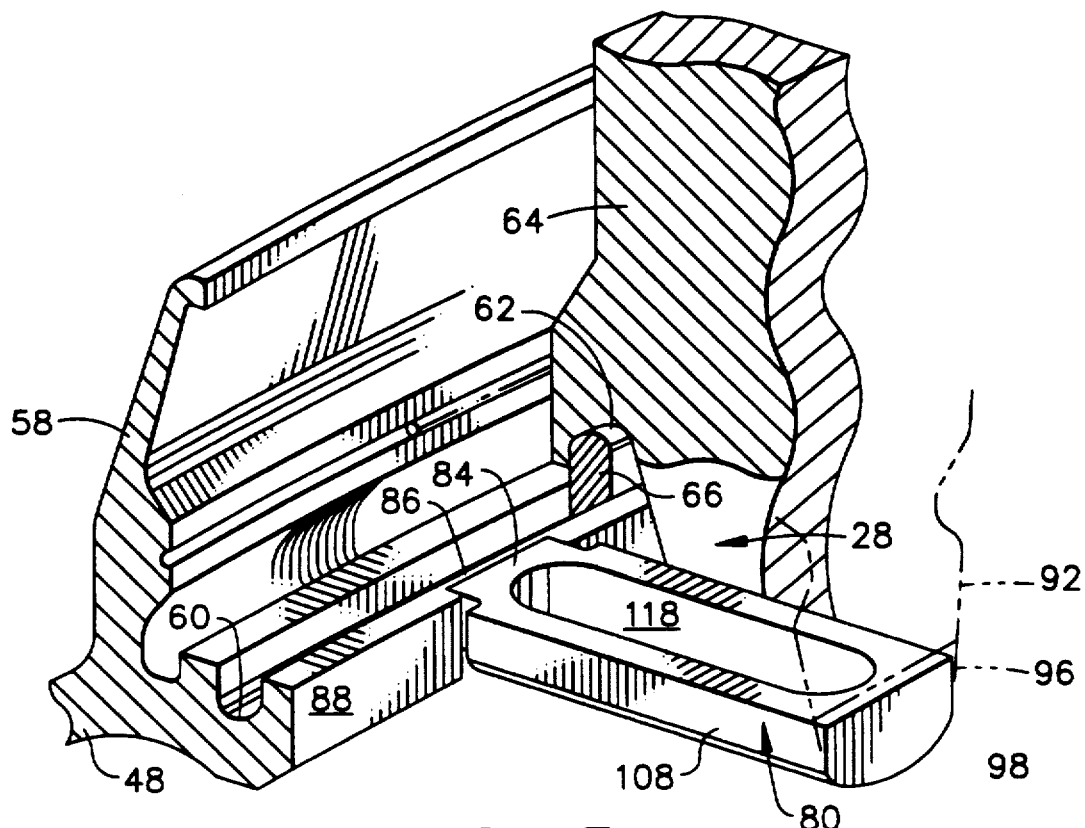
FIG. 3 is a detail of FIG. 2 showing the anti rotation key in perspective.
Figure 4:
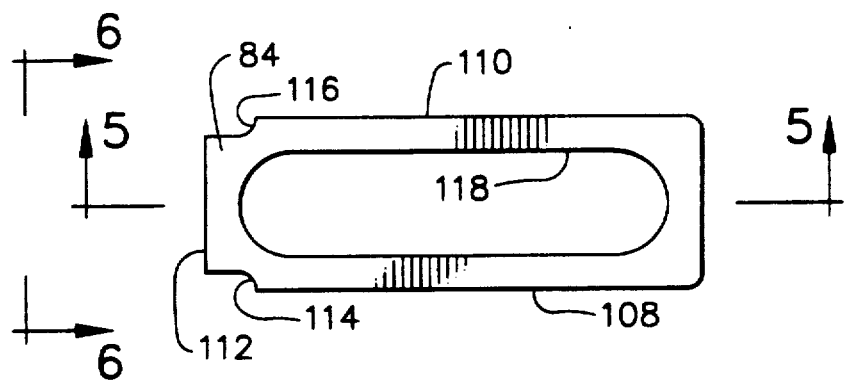
FIG. 4 is a top view of the anti-rotation key of FIG. 1.
Figure 5:
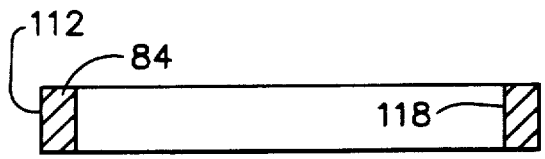
FIG. 5 is a sectional view of the key taken along line 5—5 of FIG. 4.
Figure 6:
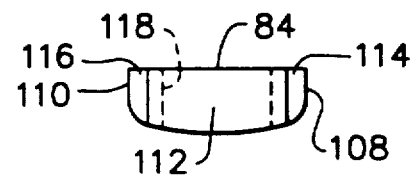
FIG. 6 is an end view of the key as shown along line 6—6 of FIG. 4.

Relative circumferential movement of interstage seal 12 and disk 16 is prevented by the anti-rotation system 10. As shown in FIGS. 1-3, a key 80 is inserted in dovetail slot 28 formed between disk post 64 of second stage disk 16.

The key 80 is inserted axially into the dovetail slot 28 until boss 84, located on the key 80 engages a slot 86 formed in the aft surface 88 of the peripheral rim 58 of the aft arm 48. The assembly of the anti-rotation key 80 occurs after the stage 2 disk 16 is assembled onto the aft arm 48 of the interstage seal 12. Dovetail slot 28 on disk post 64 are identified as being lined up with slots 86 located on the aft surface 88 of the interstage seal rim 58. The anti-rotation key 80 assures proper circumferential alignment of the interstage seal rim 58 to the second stage disk 16. After the anti-rotation key 80 is installed into the dovetail slot 28, a turbine blade 90 is installed into the dovetail slot 28, and over the anti-rotation key 80. An aft blade retainer 92 is assembled to the aft surface 94 of the disk post 64.

Blade retainer 92 includes a tab 96 which is positioned over the aft surface 98 of the anti-rotation key 80. Seal plate 92 is connected to the second stage disk 16 by a connection 100. The blade retainer 92 has a forwardly extending tab 102 which mesh with radially outwardly extending hook 104 on web 20 of disk 16. Positioned between inwardly extending tab and outwardly extending tab 104 is a locking ring 106.

During operation of the engine, the anti-rotation key 80 is completely contained by interfacing hardware, the outward radial movement of the key 80 is constrained by the turbine blades 90, with the forward axial movement of the key 80 restricted by the interstage seal rim 58 while the aft axial movement of the key 80 is restricted by tab 96 of the blade retainer 92. The key 80 prevents rotation of the interstage seal 12 in relation to disk 16 by transferring tangential load from the interstage seal to the disk along the length of the disk post 64.

The anti-rotation torque capability of the key 80 is maximized by the key being located at the seal rim 58 rather than the seal bore 44. The torque carrying capability is increased because the radius is largest at this location.

The shape of the key 80 allows for insertion into the dovetail slot 28 and for turbine blade cooling air to reach the blade 90. As shown in FIGS. 3-6, the sides 108, 110 are contoured to the same shape as the dovetail slot 28 to allow even loading along disk post 64. At the forward surface 112, sides 108, 110 are contoured 114, 116 for forming tab 84. A longitudinal slot 118 is formed along the length of the key 80 to allow blade cooling air 120, FIG. 2, to flow radially outward to the turbine blade 90.

During operation of the turbine engine, relative circumferential or rotational movement between the seal 12 and disk 14 is prevented by the anti-rotation system 10. Shear forces and crush forces imposed on the key 80 are easily dissipated by the large surface area of the key. In addition, the overall weight of the key 80 is lower due to the fact that no additional hardware is required for retention of the key or keys.

While the form of apparatus herein described constitutes a preferred embodiment of this invention, it is to be understood that the invention is not limited to this precise form of apparatus, and that changes may be made therein without departing from the scope of the invention. For example, variations in the shape of the key can be varied to adapt to different mating hardware, and can be utilized in other locations in the turbine engine to replace current anti-rotation tabs and rings.

What is claimed is:

1. In a turbine engine of a type having a turbine section including first and second stage disks, said disks including a plurality of dovetail slots, and an interstage seal located between said disks, said seal including a web portion having forward and aft arms, an interstage seal anti-rotation system comprising:
- said aft arm having interconnecting bayonet means for preventing relative axial movement between said second stage disk and said seal;
- key means positioned in at least one dovetail slot for interconnecting said bayonet means and said second stage disk and preventing relative circumferential movement between said interstage seal and said second stage disk; and
- an aft seal plate for retaining said key means in said interconnected position with said seal and said second stage disk.

2. The system of claim 1 wherein said bayonet means includes means for receiving said key means in said interconnected position.

3. The system of claim 2 wherein said receiving means is a slot formed in a rim of said aft arm bayonet means.

4. The system of claim 3 wherein said key means includes a tab formed on a forward surface for engaging said slot.

5. The system of claim 4 wherein said key means includes a slot formed along the length of said key means for allowing blade cooling air to flow radially outward.

6. The system of claim 5 wherein said key means is a key contoured to coincide with said dovetail slot to maximize the translation of tangential load from said interstage seal to said second stag disk.

7. The system of claim 6 further comprising means for retaining said key radially.

8. The system of claim 7 wherein said radially retaining means is a turbine blade.

9. The system of claim 8 wherein a key is located within a plurality of dovetail slots.

10. In a turbine engine of a type having a turbine section including first and second stage disks, said disks including a plurality of dovetail slots, and an interstage seal located between said disks, said seal including a web portion having a forward arm and an aft arm, an interstage seal anti-rotation system comprising:
- said aft arm having a bayonet connection between said second stage disk and said seal;
- an anti-rotation key positioned in at least one dovetail slot for interconnecting said aft arm bayonet connection and said second stage disk for preventing relative circumferential movement between said interstage seal and said second stage disk;
- said key including a tab formed on a forward surface for engaging a slot formed in said bayonet connection, and a slot formed along its length for allowing blade cooling air to flow radially outward; and
- an aft seal plate for retaining said key in said interconnected position with said seal and said second stage disk, whereby said key maximizes the translation of tangential load from said interstage seal to said second stage disk.

11. The system of claim 10 wherein a key is located in a plurality of dovetail slots.

* * * * *